(12) United States Patent
Awwad et al.

(10) Patent No.: US 11,592,522 B1
(45) Date of Patent: Feb. 28, 2023

(54) METHOD AND RADAR SYSTEM FOR DETERMINING ROAD CONDITIONS

(71) Applicant: APTIV TECHNOLOGIES LIMITED, St. Michael (BB)

(72) Inventors: Sara Awwad, Wuppertal (DE); Dennis Vollbracht, Hilden (DE)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 0 days.

(21) Appl. No.: 17/944,570

(22) Filed: Sep. 14, 2022

(30) Foreign Application Priority Data

Sep. 17, 2021 (EP) .................................. 21197464

(51) Int. Cl.
*G01S 7/41* (2006.01)
*G01S 7/02* (2006.01)
(Continued)

(52) U.S. Cl.
CPC ............ *G01S 7/412* (2013.01); *B60W 40/06* (2013.01); *G01S 7/025* (2013.01); *G01S 13/931* (2013.01)

(58) Field of Classification Search
CPC ........ B60W 40/06; G01S 7/412; G01S 7/025; G01S 13/931
See application file for complete search history.

(56) References Cited

U.S. PATENT DOCUMENTS 4,107,678 A * 8/1978 Powell ................. G01S 7/2923
 342/361
6,404,377 B1 * 6/2002 Lee ...................... H01Q 13/085
 343/705

(Continued)

FOREIGN PATENT DOCUMENTS

DE 102015003115 A1 9/2016
DE 102018201620 A1 8/2019
(Continued)

OTHER PUBLICATIONS

European Search Report issued by the European Patent Office in connection with International Application No. 21197464.7, dated Mar. 14, 2022.

(Continued)

*Primary Examiner* — Peter M Bythrow
(74) *Attorney, Agent, or Firm* — Carter, DeLuca & Farrell LLP; George Likourezos

(57) ABSTRACT

A method is provided for determining a road condition by using a radar system having transmitter and receiving units for transmitting and receiving radar waves having two different polarizations and providing transmit and receive signals indicating an intensity of the transmitted and received radar waves. Co-polarized backscattering coefficients and at least one cross-polarized backscattering coefficient are determined based on the transmit and receive signals. If the cross-polarized backscattering coefficient is greater than or equal to a threshold, the road condition is determined based on a ratio of the co-polarized backscattering coefficients and based on a difference of one of the co-polarized backscattering coefficients and the cross-polarized backscattering coefficient. If the cross-polarized backscattering coefficient is smaller than the threshold, the road condition is determined based on the ratio and a difference of the co-polarized backscattering coefficients.

15 Claims, 7 Drawing Sheets

Figure 1:
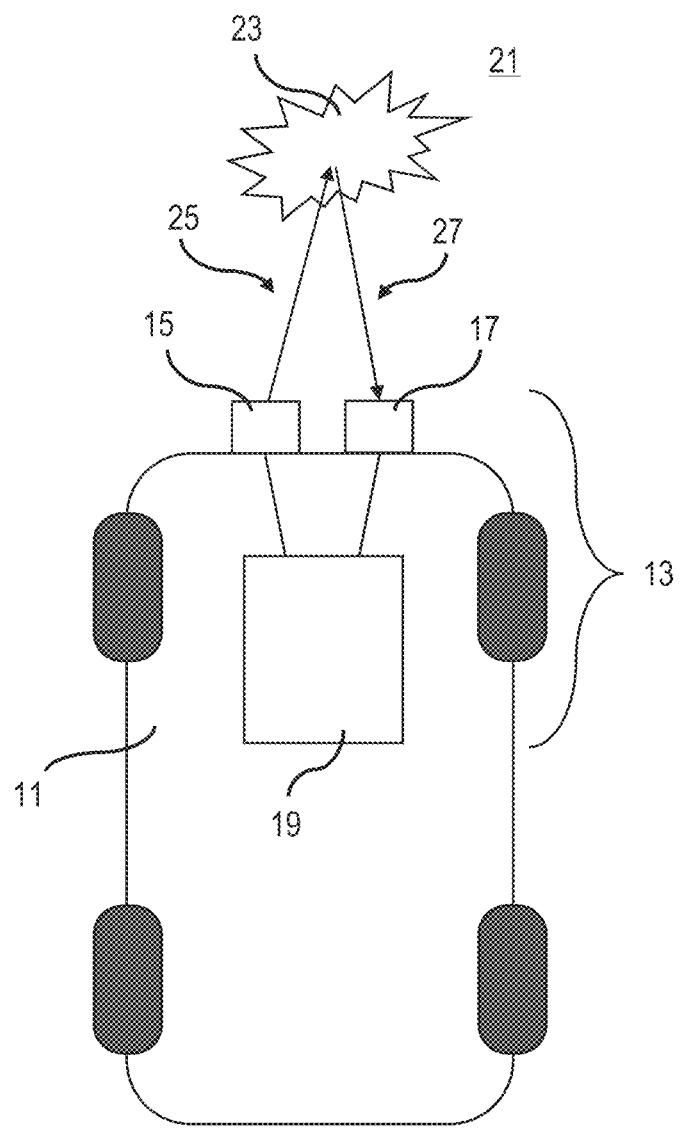

(51) Int. Cl.
*B60W 40/06* (2012.01)
*G01S 13/931* (2020.01)

(56) References Cited

U.S. PATENT DOCUMENTS

| | | | | |
|---|---|---|---|---|
| 6,967,612 | B1* | 11/2005 | Gorman | G01S 13/887 |
| | | | | 342/52 |
| 9,081,086 | B2* | 7/2015 | Nakamura | G06V 20/584 |
| 9,341,708 | B2* | 5/2016 | Nakamura | G01S 13/89 |
| 2014/0118179 | A1* | 5/2014 | Alland | G01S 13/867 |
| | | | | 342/22 |
| 2015/0014533 | A1* | 1/2015 | Nakamura | G01S 13/88 |
| | | | | 250/336.1 |
| 2015/0123838 | A1* | 5/2015 | Shi | G01S 13/867 |
| | | | | 342/70 |
| 2017/0166214 | A1* | 6/2017 | Hoare | G01S 13/862 |
| 2017/0168156 | A1 | 6/2017 | Hoare et al. | |
| 2017/0293812 | A1* | 10/2017 | Itoh | H04N 5/2256 |
| 2019/0193735 | A1* | 6/2019 | Cherniakov | B60W 40/068 |
| 2019/0271765 | A1* | 9/2019 | Ben Khadhra | G01S 7/025 |
| 2019/0277964 | A1* | 9/2019 | Badin | G01S 7/412 |
| 2019/0331790 | A1* | 10/2019 | Ben Khadhra | G01S 7/414 |
| 2020/0062245 | A1* | 2/2020 | Samotsvet | G06T 7/60 |
| 2020/0271751 | A1* | 8/2020 | Mayer | G01S 13/003 |
| 2021/0239791 | A1* | 8/2021 | Vollbracht | G01S 13/931 |
| 2021/0239821 | A1* | 8/2021 | Vollbracht | G01S 7/025 |
| 2022/0221554 | A1* | 7/2022 | Kawaji | G01S 13/345 |

FOREIGN PATENT DOCUMENTS

| | | | | |
|---|---|---|---|---|
| DE | 102018203924 | A1 | 9/2019 | |
| EP | 2216659 | B1 | 4/2013 | |
| EP | 2653882 | A1 * | 10/2013 | G01S 13/88 |
| EP | 2653882 | A1 | 10/2013 | |
| EP | 2897845 | B1 | 7/2015 | |
| JP | 4120114 | B2 | 7/2008 | |

OTHER PUBLICATIONS

Bystrov Aleksandr et al: "Analysis of classification algorithms applied to road surface recognition", IEEE Radar Conference (RADARCON), May 10, 2015, pp. 907-911.
Trummer Stefan et al: "Autonomous Driving Features based on 79 GHz Polarimetric Radar Data" ,2018 15th European Radar Conference (EURAD), European Microwave Association, pp. 18-21, Sep. 26, 2018.

* cited by examiner

METHOD AND RADAR SYSTEM FOR DETERMINING ROAD CONDITIONS

CROSS-REFERENCE TO RELATED APPLICATION

This application claims the benefit of European patent application serial number EP21197464.7 filed on Sep. 17, 2021. The entire contents of which are hereby incorporated by reference herein.

FIELD

The present disclosure relates to a method and a radar system for determining the condition of a road e.g. in the environment of a vehicle. The method requires a radar system which may be installed at the vehicle and which comprises radar transmitter and receiving units configured to transmit and to receive, respectively, radar waves having at least two different polarizations.

BACKGROUND

The condition of a road is always an important safety aspect for a vehicle which is driving on the road. The reliable determination or estimation of road conditions is therefore a relevant application for radar systems installed in the vehicle. Furthermore, the reliable monitoring of the road conditions plays an important role for the safety in autonomous driving.

The condition of a road generally depends on a plurality of variables that need to be considered, e.g. if a radar system is to be configured to determine the road condition. Such variables are, for example, the material, the curvature and the roughness of the road as well as weather conditions. Moreover, roads may be random surfaces consisting of various composite materials. In addition, rain, ice or snow may be deposited on the road and can have different components, temperatures and internal properties. Therefore, it is a challenging task to provide a radar system being able to determine reliable information on the road condition.

Existing approaches for determining road conditions by using radar systems neglect some of the above-mentioned variables of the road and/or use different frequencies or polarizations of the transmitted radar waves. For example, linearly polarized waves having frequencies between 24 and 77 GHz have been used in order to determine the differential backscattering coefficient of a road surface. Although the results have been able to distinguish between different types of weather conditions for a road surface, two different frequencies have been required which increases the cost of the radar system. In addition, this procedure has been tested at different weather conditions for the same road surface only, but not for different types of road surfaces. This may lead to mixing up different surfaces such that some ambiguity may remain regarding the condition of the road.

Furthermore, low terahertz microwaves (e.g. 0.6 to 0.9 THz) have been proposed for an automotive radar which has also been able to distinguish between several road surfaces. However, such a low terahertz radar is costly and up to now unusual for automotive radar applications. In addition, the use of circularly polarized radio waves has been proposed for an application with autonomous driving features. Although such a radar system has been suitable for determining road conditions, providing circular polarization is also related to additional efforts and higher cost.

When using a typical automotive radar system at a frequency of e.g. 77 GHz for determining road conditions, the classification of these road conditions may not be able to distinguish between surfaces which are wet and rough, and surfaces which are dry and smooth, e.g. between wet asphalt and dry concrete. Most of the proposals for improvement, e.g. the approaches as described above, increase the cost of the radar system or may even require a complex system design. Moreover, some uncertainties and ambiguities may still remain regarding the classification of road conditions when applying such improved system designs.

Accordingly, there is a need to provide a method and a radar system which are able to determine a condition of a road in a reliable and unambiguous manner.

SUMMARY

The present disclosure provides a computer implemented method, a computer system and a non-transitory computer readable medium according to the independent claims. Embodiments are given in the subclaims, the description and the drawings.

In one aspect, the present disclosure is directed at a computer implemented method for determining a condition of a road by using a radar system. The radar system comprises a radar transmitter unit configured to transmit radar waves having two different polarizations and a radar receiving unit configured to receive radar waves having two different polarizations. The radar system is further configured to provide transmit signals and receive signals indicating an intensity of the respective transmitted and received radar waves. According to the method, co-polarized backscattering coefficients and at least one cross-polarized backscattering coefficient are determined via a processing device based on the transmit signals and the receive signals provided by the radar system. If the cross-polarized backscattering coefficient is greater than or equal to a predetermined cross-polarization threshold, the condition of the road is determined via the processing device based on a ratio of the co-polarized backscattering coefficients and based on a difference of one of the co-polarized backscattering coefficients and the cross-polarized backscattering coefficient. If the cross-polarized backscattering coefficient is smaller than the cross-polarization threshold, the condition of the road is determined via the processing device based on the ratio and difference of the co-polarized backscattering coefficients.

The radar system may be installed in a vehicle. Therefore, the radar system may be configured to monitor the environment of the vehicle including the lane or the road on which a vehicle is currently located. Furthermore, the term "road condition" generally refers to a certain type of a road surface, e.g. asphalt, concrete, grass etc., and at the same time to the state of a road surface at given weather conditions, e.g. whether the road surface is dry, wet, icy, covered with snow etc.

For performing the method, a so-called dual-polametric radar system is required which is able to transmit and to receive radar waves having two different linear polarizations. The transmitted radar waves may therefore be described by a vector having two components representing complex electric fields in the respective polarization direction, e.g. a respective component in the horizontal and vertical directions. In other words, the radar system may be equipped with transmit and receive antennas for e.g. horizontally and vertically polarized radar waves. However, radar waves having other polarizations may also be used for the method. Examples for other polarizations are radar waves being linear polarized at 45° and at 135°, and right circularly polarized (RHC) and left circularly polarized (LHC) waves. Furthermore, it is important that the radar antennas are purely polarized such that the inherent cross-polarized contribution of the radar system is low and does not disturb the measurement of the cross-polarized radar return which is received from the road. That is, the radar system needs to have the capability to detect the cross-polarized radar return properly. Also, we are using the radio frequency of 77 GHz, but this method can apply other frequencies by changing the thresholds.

Each scattering object, i.e. the road surface for the present method, may be considered as a polarization transformer changing the polarization of the transmitted radar waves. This transformation from a transmitted wave vector to a received wave vector is usually described by a scattering matrix which is applied to the transmitted wave vector in order to generate the received wave vector.

The co-polarized backscattering coefficients refer to the diagonal elements of the scattering matrix, whereas the cross-polarized backscattering coefficients refer to the non-diagonal elements of the scattering matrix. In other words, the co-polarized backscattering coefficients relate the transmitted and received radar waves to each other which have the same polarization, whereas the cross-polarized backscattering coefficients relate transmitted and received radar waves to each other which have different polarizations. Moreover, the cross-polarization threshold may be defined empirically, e.g. by defining a lower limit suitable for the processing device for determining a useful cross-polarized backscattering coefficient.

In addition, the transmitter unit and the receiving unit may be sensitive at such elevation angles with respect to the vehicle (i.e. with respect to a plane parallel to the road surface) that the radar system is able to monitor a predefined portion of the road surface. For example, an elevation angle of about −15° may be used.

When analyzing the backscattering coefficients (i.e. dBsm, radar cross section in decibels), it turned out that the ratio of the co-polarized backscattering coefficients is not sufficient to determine the road condition since it is not possible to distinguish different road surfaces accurately based on this ratio if a radar frequency of 77 GHz is used. On the other hand, the cross-polarized backscattering coefficients are more effected by the roughness and the material of the road and by the weather conditions than the co-polarized backscattering coefficients, while the co-polarized backscattering coefficient of the vertically polarized wave is the least effected by the weather condition.

Therefore, if a suitable cross-polarized backscattering coefficient can be determined, the difference of one of the co-polarized backscattering coefficients, e.g. the co-polarized backscattering coefficient of the vertically polarized wave, and a cross-polarized backscattering coefficient is considered in addition to the ratio of the co-polarized backscattering coefficients in order to determine the road condition. It turned out that if the ratio of the co-polarized backscattering coefficients is plotted versus the difference of one of the co-polarized backscattering coefficients, e.g. the co-polarized backscattering coefficient of the vertically polarized wave, and a cross-polarized backscattering coefficient, different road conditions can be related to different and separated regions within such a plot. That is, different road conditions, e.g. wet asphalt, dry asphalt, dry concrete and grass, can be reliably distinguished by the method if the cross-polarized backscattering coefficient is available.

On the other hand, if no cross-polarized backscattering coefficient is available (i.e. if it is smaller than the cross-polarization threshold), the method is also able to provide suitable information regarding the road condition based on the co-polarized backscattering coefficients. In this case, the difference between the co-polarized backscattering coefficients is additionally considered, and a plurality of data points may be required for the transmit signals and the receive signals in order to determine the road condition, wherein each data point represents the backscattering coefficient at a different elevation angle. That is, the road condition may be determined based on variances and averages of the ratio and the difference of the co-polarized backscattering coefficients. In contrast, one single data point derived from the transmit signals and the receive signals for the backscattering coefficients may be sufficient if the cross-polarized backscattering coefficient is available.

The method has the advantage that it is possible to distinguish different types of road surfaces as well as a wet and a dry road at the same time. For example, the method may be able to identify wet asphalt, dry asphalt and dry concrete based on the co-polarized and cross-polarized backscattering coefficients derived from the transmit and receive signals. In other words, the problem of mixing up between rough wet surfaces and smooth dry surfaces is overcome. Furthermore, a radar system providing one single radar frequency, e.g. 77 GHz, is sufficient for performing the method. In summary, the method is able to provide an accurate estimate for the type of the road surfaces and the weather conditions. Since no complicated operations are required, the computational effort for performing the method is low. Hence, an inexpensive, simple and efficient method for determining road conditions is provided.

The method may comprise one or more of the following features:

The radar transmitter unit may be configured to transmit radar waves having horizontal polarization and radar waves having vertical polarization, and the radar receiving unit may be configured to receive radar waves having horizontal polarization and radar waves having vertical polarization. The ratio of the co-polarized backscattering coefficients may be determined by dividing a backscattering coefficient for horizontally polarized transmitted radar waves and horizontally polarized received radar waves (HH backscattering coefficient) by a backscattering coefficient for vertically polarized transmitted radar waves and vertically polarized received radar waves (VV backscattering coefficient).

The cross-polarized backscattering coefficient may be the backscattering coefficient for horizontally polarized transmitted radar waves and vertically polarized received radar waves (HV backscattering coefficient). If the HV backscattering coefficient is greater than or equal to the predetermined cross-polarization threshold, the difference of one of the co-polarized backscattering coefficients and the cross-polarized backscattering coefficient may be determined as the difference between the VV backscattering coefficient and the HV backscattering coefficient.

If the HV backscattering coefficient is smaller than the predetermined cross-polarization threshold, the difference of the co-polarized backscattering coefficients may be determined as the difference between the VV backscattering coefficient and the HH backscattering coefficient. Furthermore, if the HV backscattering coefficient is smaller than the predetermined cross-polarization threshold, a plurality of HH backscattering coefficients and a plurality of VV backscattering coefficients may be determined at different elevation angles, and wetness of the road may be determined based on a variance of the ratio with respect to the difference.

The condition of the road may include a wet surface if the variance is greater than a predetermined variance threshold, and the condition of the road may include a dry surface if the variance is equal to or smaller than a predetermined variance threshold. Determining the condition of the road may additionally include determining a material of the road based on one of the co-polarized backscattering coefficients. Moreover, the material of the road may be determined based on the VV backscattering coefficient.

If the HV backscattering coefficient is smaller than the predetermined cross-polarization threshold, a plurality of HH backscattering coefficients and a plurality of VV backscattering coefficients may be determined, and if an average of the ratio of the HH backscattering coefficients and the VV backscattering coefficients is smaller than or equal to 1 and an average of the difference between the VV backscattering coefficients and the HH backscattering coefficients is smaller than or equal to 0, the condition of the road may be determined based on the average of the ratio with respect to the average of the difference.

The condition of the road may include a high irregularity due to vertical objects (such as grass) if the average of the ratio of the HH backscattering coefficients and the VV backscattering coefficients is close to 1 and the average of the difference between the VV backscattering coefficient and the HH backscattering coefficient is close to 0, whereas the condition of the road may include snow on the road if the average of the ratio of the HH backscattering coefficients and the VV backscattering coefficients is smaller than 1 and the average of the difference between the VV backscattering coefficient and the HH backscattering coefficient is smaller than 0.

If the cross-polarized backscattering coefficient is greater than or equal to the predetermined cross-polarization threshold, the condition of the road may be determined based on thresholds for the ratio of the co-polarized backscattering coefficients and for the difference of one of the co-polarized backscattering coefficients and the cross-polarized backscattering coefficient. For a plurality of predefined road conditions, the thresholds may define respective ranges for the ratio of the co-polarized backscattering coefficients and respective ranges for the difference of one of the co-polarized backscattering coefficients and the cross-polarized backscattering coefficient. A respective combination of a range for the ratio of the co-polarized backscattering coefficients and of a range for the difference of one of the co-polarized backscattering coefficients and the cross-polarized backscattering coefficient may be uniquely related to one of the predefined road conditions.

According to an embodiment, the radar transmitter unit may be configured to transmit radar waves having horizontal polarization and radar waves having vertical polarization, whereas the radar receiving unit may be configured to receive radar waves having horizontal polarization and radar waves having vertical polarization. The ratio of the co-polarized backscattering coefficients may be determined by dividing a backscattering coefficient for horizontally polarized transmitted radar waves and horizontally polarized received radar waves (which may be denoted as HH backscattering coefficient) by a backscattering coefficient for vertically polarized transmitted radar waves and vertically polarized received radar waves (which may be denoted as VV backscattering coefficient). The horizontal and vertical directions are defined with respect to the surface of the road.

It has been observed that the HH backscattering coefficient is more sensitive to changes in the roughness of surfaces than the VV backscattering coefficient. Therefore, the sensitivity of the method may be improved by considering the ratio of the HH backscattering coefficient and the VV backscattering coefficient.

The cross-polarized backscattering coefficient may be the backscattering coefficient for horizontally polarized transmitted radar waves and vertically polarized received radar waves (which may be denoted as HV backscattering coefficient). The HV backscattering or return is mostly produced by irregularities of surfaces on objects, i.e. of the road surface. Hence, selecting the HV backscattering coefficient may provide a reliable indicator for irregularities and roughness of the road surface. It is noted that the HV backscattering coefficient is equivalent to the VH backscattering coefficient in this application, i.e. the backscattering coefficient for vertically polarized transmitted radar waves and horizontally polarized received radar waves.

In case that the HV backscattering coefficient is greater than or equal to the predetermined cross-polarization threshold, the condition of the road may be determined based on the ratio of the HH backscattering coefficient and the VV backscattering coefficient and based on the difference between the VV backscattering coefficient and the HV backscattering coefficient. It turned out that the HV backscattering coefficient is the most effected of the backscattering coefficients with respect to the roughness and the material of the road as well as with respect to the weather conditions, while the VV backscattering coefficient is the least effected. Therefore, using the difference between the VV and HV backscattering coefficients may be expected to be huge and to be able to separate different road conditions reliably. In other words, the sensitivity of the method may be further increased by considering the difference between the VV and HV backscattering coefficients.

On the other hand, if the HV backscattering coefficient is smaller than the predetermined cross-polarization threshold, the difference of the co-polarized backscattering coefficients may be determined as the difference between the VV backscattering coefficient and the HH backscattering coefficient. Due to the different sensitivity of the VV and HH backscattering coefficients with respect to the roughness of the road surface, it may be expected that the difference between the VV and HH backscattering coefficients may be a suitable indicator for changes in the roughness of the road surface. Therefore, the sensitivity of the method may be further enhanced by considering the difference of the VV and HH backscattering coefficients.

According to a further embodiment, if the HV backscattering coefficient is smaller than the predetermined cross-polarization threshold, a plurality of HH backscattering coefficients and a plurality of VV backscattering coefficients may be determined at different elevation angles. In this case, wetness of the road may be determined based on a variance of the ratio (i.e. HH/VV) with respect to the difference (i.e. VV−HH).

Due to the different response of the H and V polarizations of the radar waves at the road surface, it may be expected that the variance of the ratio related to the difference may be an indicator for different types of road conditions. For example, the condition of the road may include a wet surface if the variance is greater than a predetermined variance threshold, and the condition of the road may include a dry surface if the variance is equal to or smaller than the predetermined variance threshold. That is, the variance may be used for distinguishing wet and dry surfaces irrespective of the type or material of the road.

Furthermore, a material of the road may be determined based on one of the co-polarized backscattering coefficients. In detail, the material of the road may be determined based on the VV backscattering coefficient. Therefore, in addition to distinguishing wet and dry road surfaces, the method may also be able to distinguish different road materials like asphalt, concrete and grass etc, using either HH or VV backscattering coefficient. Since the VV backscattering coefficient is less fluctuating with respect to changing elevation angles than the further backscattering coefficients, it may be expected that the VV backscattering coefficient will represent a clear indicator for different road materials.

According to a further embodiment, if the HV backscattering coefficient is smaller than the predetermined cross-polarization threshold, a plurality of HH backscattering coefficients and a plurality of VV backscattering coefficients may be determined, and if an average of the ratio of the HH backscattering coefficients and the VV backscattering coefficients is smaller than or equal to 1 and if an average of the difference between the VV backscattering coefficients and the HH backscattering coefficients is smaller than or equal to 0, the condition of the road may be determined based on the average of the ratio with respect to the average of the difference. The condition of the road may include a high irregularity due to vertical objects (such as grass) if the average of the ratio (i.e. HH/VV) is close to 1 and the average of the difference (i.e. VV−HH) is close to 0, whereas the condition of the road may include snow on the road if the average of the ratio (i.e. HH/VV) is smaller than 1 and the average of the difference (i.e. VV−HH) is smaller than 0. An example for the irregular rough road may be gravel or grass. It turned out that the average of the ratio with respect to the average of the difference may include different regions for different road conditions like snow and an irregular rough road. Therefore, the method may be able to recognize snow on the road in an unambiguous manner.

According to a further embodiment, if the cross-polarized backscattering coefficient is greater than or equal to the predetermined cross-polarization threshold, the condition of the road may be determined based on thresholds for the ratio of the co-polarized backscattering coefficients and for the difference of one of the co-polarized backscattering coefficients, e.g. the VV backscattering coefficient, and the cross-polarized backscattering coefficient. For a plurality of predefined road conditions, these thresholds may define respective ranges for the ratio of the co-polarized backscattering coefficients and respective ranges for the difference of one of the co-polarized backscattering coefficients, e.g. the VV backscattering coefficient, and the cross-polarized backscattering coefficient. A respective combination of a range for the ratio of the co-polarized backscattering coefficients and of a range for the difference of one of the co-polarized backscattering coefficients, e.g. the VV backscattering coefficient, and the cross-polarized backscattering coefficient, may be uniquely related to one of the predefined road conditions.

That is, a relationship may be defined between the ratio and the difference, e.g. by plotting the ratio over the difference, and separate areas or regions may be defined which may be uniquely related to predefined road conditions. For example, there may be separate areas for wet asphalt, asphalt, concrete and grass which may be distinguished from each other if the ratio is plotted over the difference.

The entirety of conditions which are described above for the ratios and for the differences of different backscattering coefficients may be regarded as a decision tree using thresholds for the respective conditions. However, any other procedure may be used for analyzing the backscattering coefficients in an equivalent manner to the method steps as set forth herein. As an example, a support vector machine or a machine learning algorithm, e.g. a neural network, may be implemented in order to determine different road conditions based on the backscattering coefficients in a similar manner as described above.

In another aspect, the present disclosure is directed at a radar system configured to be installed at a vehicle. The radar system comprises a radar transmitter unit configured to transmit radar waves having two different polarizations and to provide transmit signals indicating an intensity of the transmitted radar waves, a radar receiving unit configured to receive radar waves having two different polarizations and to provide receive signals indicating an intensity of the received radar waves, and a processing device. The processing device is configured to determine co-polarized backscattering coefficients and at least one cross-polarized backscattering coefficient based on the transmit signals and the receive signals. If the cross-polarized backscattering coefficient is greater than or equal to a predetermined cross-polarization threshold, the processing device is configured to determine the condition of the road based on a ratio of the co-polarized backscattering coefficients and based on a difference of one of the co-polarized backscattering coefficients and the cross-polarized backscattering coefficient. If the cross-polarized backscattering coefficient is smaller than the cross-polarization threshold, the processing device is configured to determine the condition of the road based on the ratio and a difference of the co-polarized backscattering coefficients.

As used herein, the terms processing device and processing unit may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The processing device and the processing unit may include memory (shared, dedicated, or group) that stores code executed by the processor.

In summary, the radar system according to the disclosure includes the radar transmitter unit, the radar receiving unit and the processing device which are configured to perform the steps as described above for the corresponding method. Therefore, the benefits, the advantages and the disclosure as described above for the method are also valid for the radar system.

In another aspect, the present disclosure is directed at a computer system, said computer system being configured to carry out several or all steps of the computer implemented method described herein.

The computer system may comprise a processing unit, at least one memory unit and at least one non-transitory data storage. The non-transitory data storage and/or the memory unit may comprise a computer program for instructing the computer to perform several or all steps or aspects of the computer implemented method described herein.

In another aspect, the present disclosure is directed at a non-transitory computer readable medium comprising instructions for carrying out several or all steps or aspects of the computer implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM); a flash memory; or the like. Furthermore, the computer readable medium may be configured as a data storage that is accessible via a data connection, such as an inter-net connection. The computer readable medium may, for example, be an online data repository or a cloud storage.

The present disclosure is also directed at a computer program for instructing a computer to perform several or all steps or aspects of the computer implemented method described herein.

DRAWINGS

Figure 2:
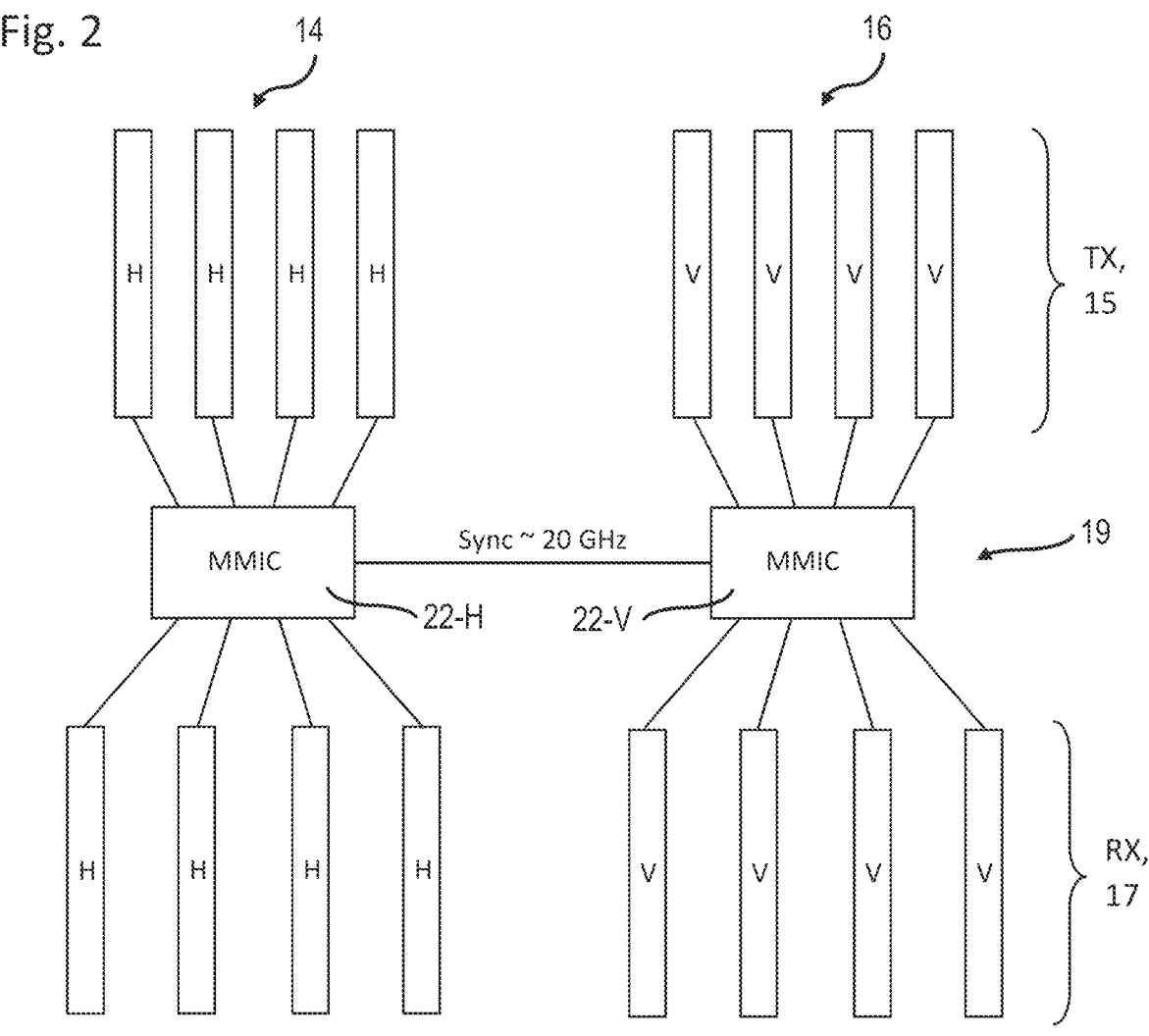
Figure 2:
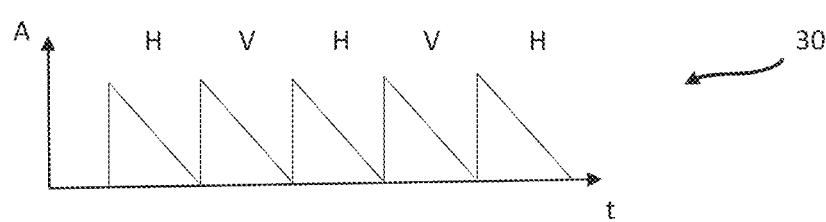
Figure 3:
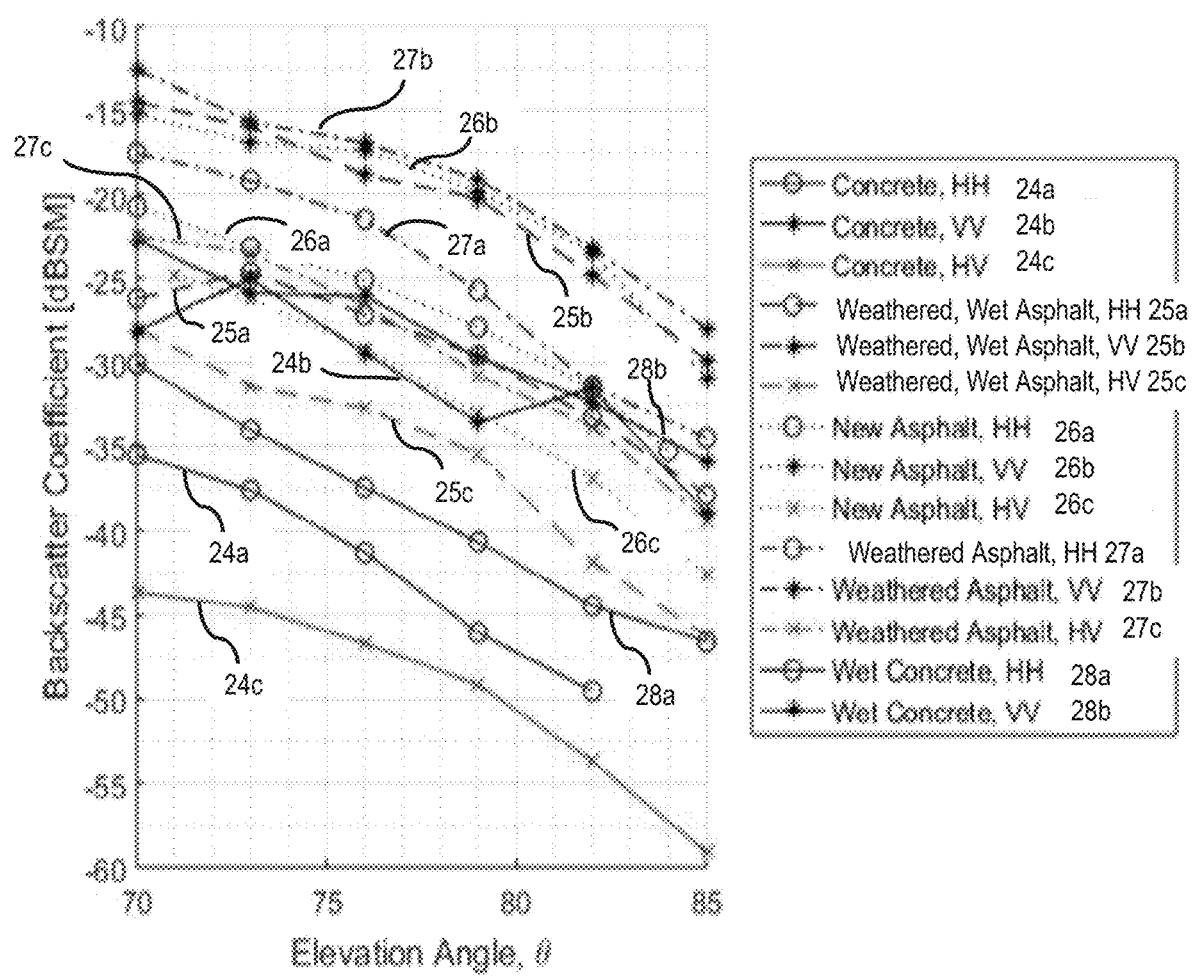
Figure 4:
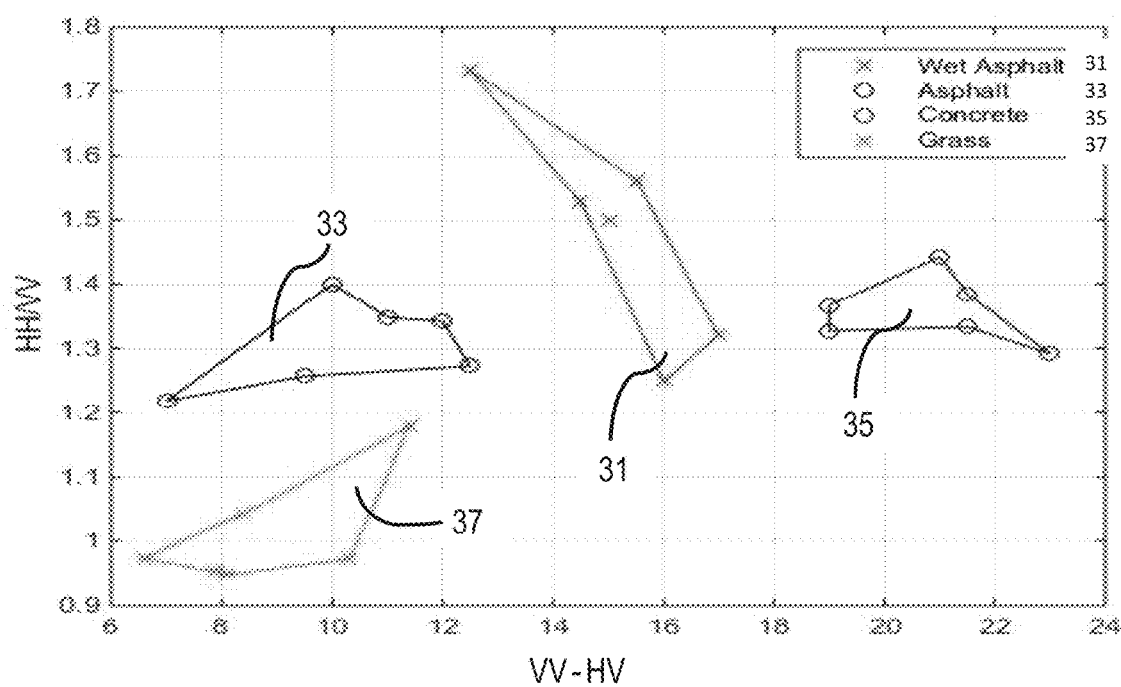
Figure 5:
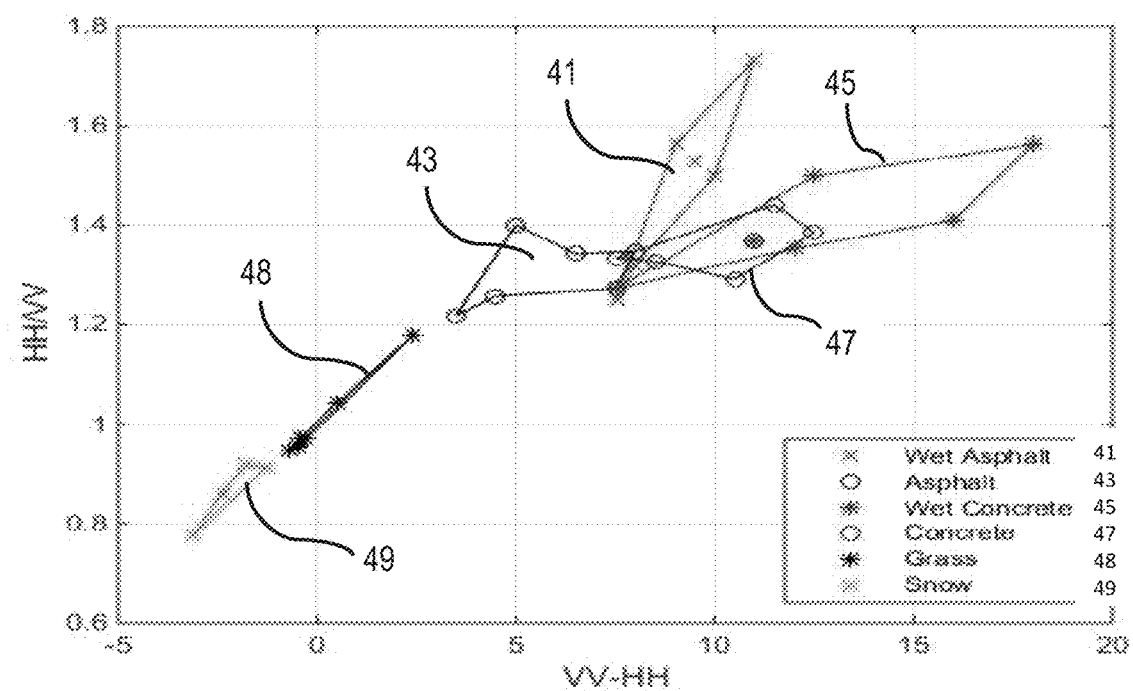
Figure 6:
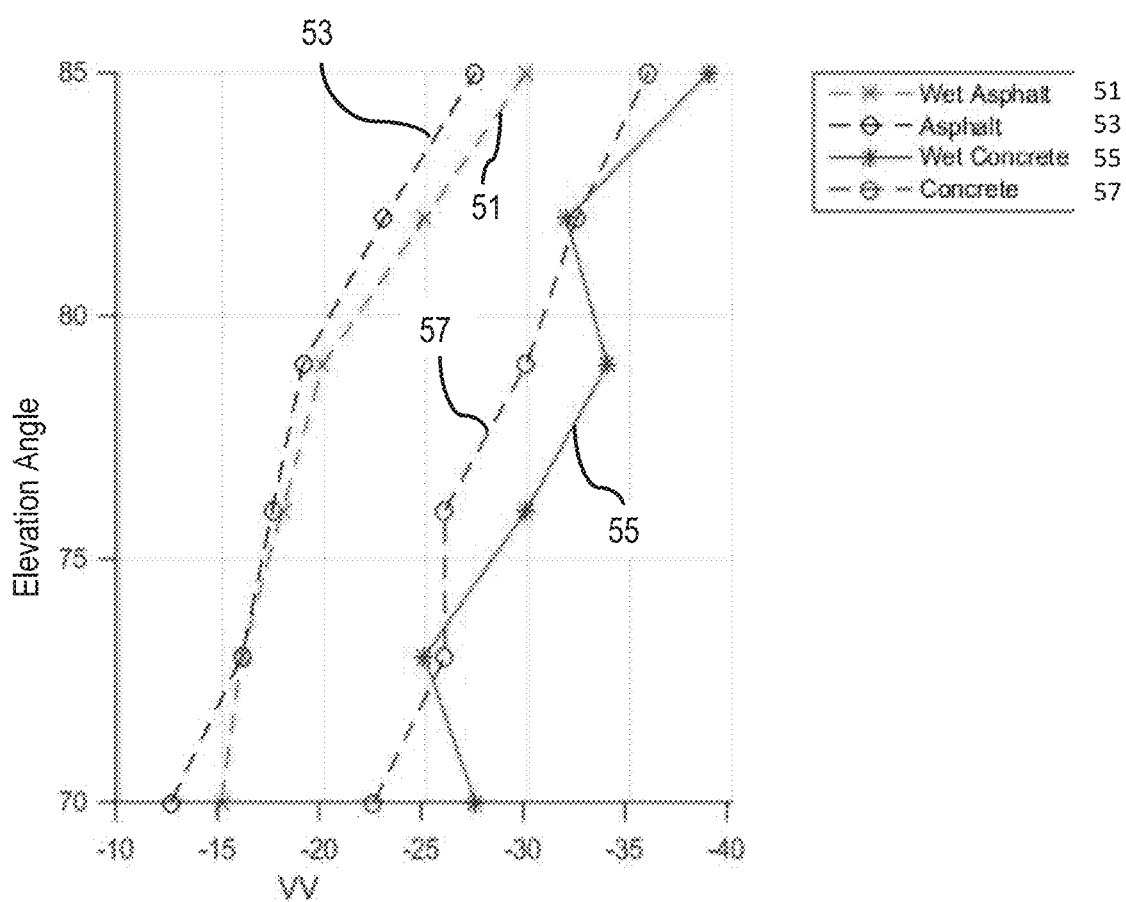
Figure 7:
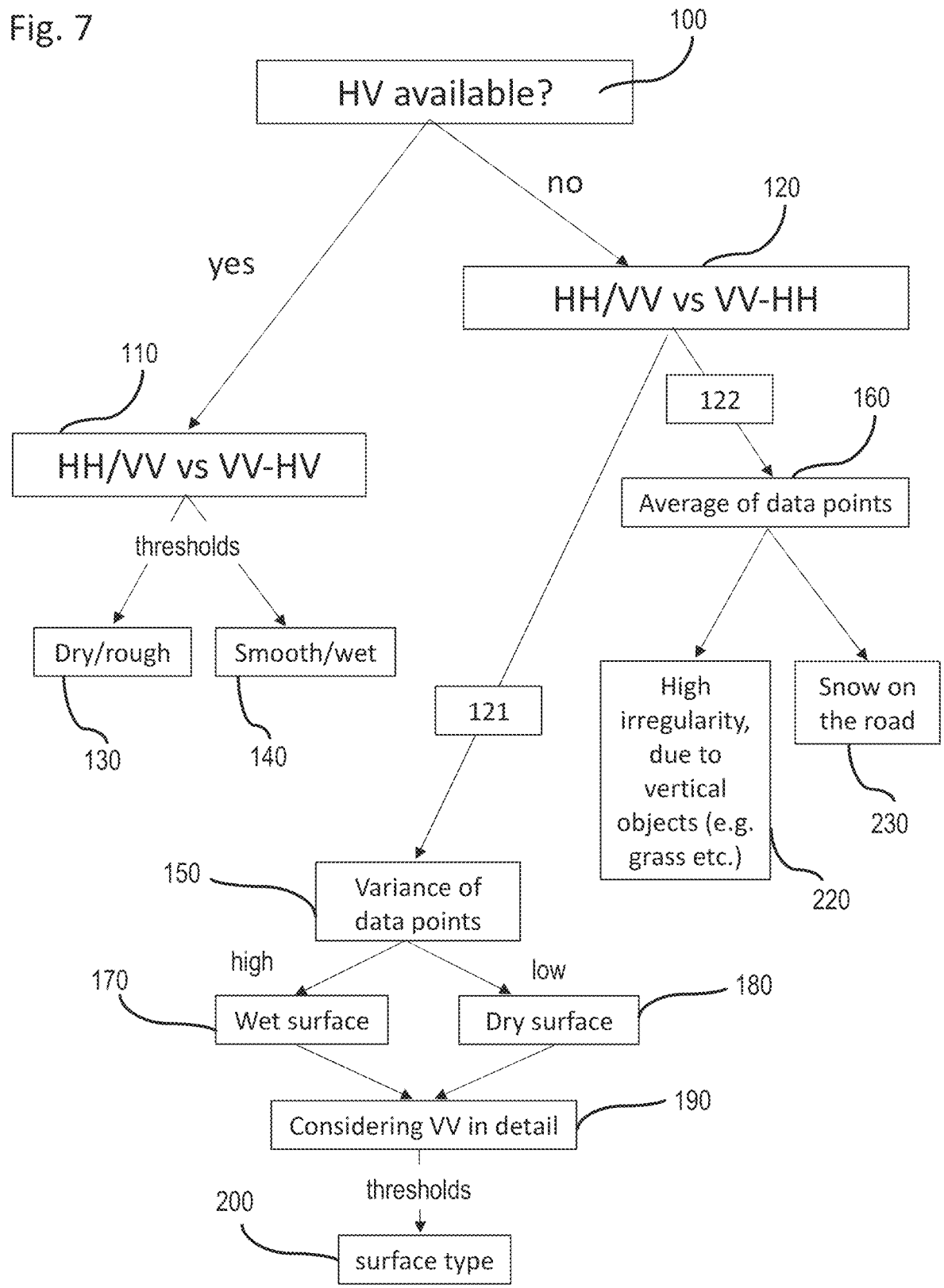

Exemplary embodiments and functions of the present disclosure are described herein in conjunction with the following drawings, showing schematically:

FIG. 1 depicts an overview of a vehicle including a radar system which is configured to determine road conditions, FIG. 2 depicts details for the transmitting (TX) and receiving (RX) channels of the radar system of FIG. 1, FIG. 3 depicts different radar backscattering coefficients over the elevation angle for different road conditions, FIG. 4 depicts the ratio of HH and VV backscattering coefficients over the difference of the VV backscattering coefficient and the HV backscattering coefficient for different road conditions, FIG. 5 depicts the ratio of the HH and VV backscattering coefficients over the difference of the VV and HH backscattering coefficients for different road conditions, FIG. 6 depicts a relationship of the elevation angle and the VV backscattering coefficient for different road conditions, and FIG. 7 depicts a decision tree representing an embodiment of the method according to the disclosure.

DETAILED DESCRIPTION

FIG. 1 depicts a schematic overview of a vehicle 11 which includes a radar system 13. The radar system 13 includes a radar transmitter unit 15, a radar receiving unit 17 and a processing device 19. The vehicle 11 is currently located on a road surface 21. A part 23 of the road surface 21 is also depicted schematically in FIG. 1, wherein this part 23 is monitored by the radar system 13.

The radar transmitter unit 15 is configured to transmit radar waves 25 having two different polarizations, and the radar receiving unit 17 is configured to receive radar waves 27 having the corresponding two different polarizations. In detail, the radar transmitter unit 15 transmits radar waves having a linear horizontal polarization (H) and radar waves having a linear vertical polarization (V). Correspondingly, the radar receiving unit 17 receives radar waves having horizontal polarization (H) and radar waves having vertical polarization (V). The horizontal and vertical directions are defined with respect to the road surface 21.

The processing device 19 is connected to the radar transmitter unit 15 and to the radar receiving unit 17 in order to receive transmit signals indicating an intensity of the respective transmitted radar waves 25 for the horizontal and the vertical polarizations, respectively. Furthermore, the processing device 19 receives receive signals from the radar receive unit 17 which indicate an intensity of the received radar waves 25 for the horizontal and vertical polarizations, respectively.

FIG. 2 depicts details of the radar transmitter unit 15, radar receiving unit 17 and the processing device 19. The units 15, 17 and the device 19 generate two different multiple input multiple output (MIMO) systems. In the present example, the radar transmitter unit 15 includes four antennas 14 for transmitting horizontally polarized waves (H), whereas the radar receiving unit 17 includes four antennas 18 for receiving horizontally polarized waves (H) and the processing device 19 includes a first MIMO integrated circuit (MMIC) 22-H for controlling the antennas 14, 18. The antennas 14, 18 and the MMIC 22-H form a first MIMO system. Similarly, the radar transmitter unit 15 includes four antennas 16 for transmitting vertically polarized waves (V), whereas the radar receiving unit 17 includes four antennas 20 for receiving vertically polarized waves (V) and the processing device 19 includes a second MIMO integrated circuit (MMIC) 22-V for controlling the antennas 16, 20. The antennas 16, 20 and the MMIC 22-V form a second MIMO system.

During operation, the antennas 14, 18 alternately transmit their corresponding horizontally (H) and vertically (V) polarized radar waves, as indicated by the diagram 30 in the lower part of FIG. 2. The diagram 30 depicts the amplitude A of the respective transmitted radar signal H or V as a function of time t. In contrast, the receiving antennas 16 (for H) and 20 (for V) are always active and receive the corresponding H and V signals, respectively.

For each point in time, the received signals can be assigned correctly due to the predetermined relationship for the phase of the transmitted signals H and V, as indicated by the diagram 30. In order to provide a proper coherent cooperation of the received (RX) channels of the MMIC 22-H and the transmitted (TX) channels of the MMIC 22-V, a synchronization of the MMIC 22-H and the MMIC 22-V is required. This synchronization is performed at a frequency of 20 GHz for the present example.

Based on the transmit signals and the receive signals, the processing device 19 is configured to determine co-polarized backscattering coefficients and cross-polarized backscattering coefficients. In detail, the transmit radar waves 25 can be described by a vector having two components which represent complex electric fields in the horizontal and vertical polarization direction, respectively. Since the part 23 of the road surface 21 can be considered as a polarization transformer, the receive radar waves 27 can also be represented by a corresponding vector having two components for complex electric fields, wherein these components for the horizontal and vertical polarization directions differ from the respective components of the transmit radar waves 25 due to the polarization transformation at the part 23 of the road surface 21.

This polarization transformation can be described by applying a scattering matrix to the vector representing the transmit radar waves 25 in order to provide the vector for the receive radar waves 27. Conversely, the matrix elements of this scattering matrix can be derived from the measured intensity of the respective transmitted and received radar waves 25, 27 for the horizontal polarization (H) and for the vertical polarization (V). The diagonal matrix elements of the scattering matrix are called co-polarized backscattering coefficients, whereas the non-diagonal elements are called cross-polarized backscattering coefficients.

For the method and the radar system 13 according to the disclosure, the backscattering coefficient derived from horizontally polarized transmitted radar waves 15 and horizontally polarized received radar waves 17 (HH backscattering coefficient), the backscattering coefficient derived from vertically polarized transmitted radar waves 15 and vertically polarized received radar waves 17 (VV backscattering coefficient) and the cross-polarized backscattering coefficient derived from horizontally polarized transmitted radar waves 15 and vertically polarized received radar waves 17 (HV backscattering coefficient) are considered in order to determine the condition of the road surface 21. For the present examples (see FIG. 3), the backscattering coefficients are determined by using radar returns which are al-ready averaged over several repeated measurements.

The HH, VV and HV backscattering coefficients are depicted in FIG. 3 over an elevation angle θ for different road conditions, i.e. for concrete (i.e. dry concrete), weathered wet asphalt, new dry asphalt, weathered dry asphalt and wet concrete. The elevation angle θ in FIG. 3 is defined with respect to a normal line of the road surface 21 such that the elevation angle of 75° corresponds to an elevation angle of −15° with respect to a longitudinal axis of the vehicle 11.

FIG. 3 and the data depicted therein are taken from Giallorenzo, M. et al.: "Radar Backscatter Measurements of Road Surfaces at 77 GHz", 2018 IEEE Antennas and Propagation Society International Symposium, 8-13 Jul. 2018, IEEE, Boston, Mass., USA. This data has been used as basis for the own investigations according to the disclosure, i.e. for the analysis as depicted in FIGS. 4 to 6 and for the decision tree as depicted in FIG. 7.

It is noted that the backscattering coefficients are depicted in units of dBsm (radar cross section in decibels), i.e. on a logarithmic scale including negative values. That is, the "weaker" backscattering coefficients (like the HV backscattering coefficient represented by the curve 24c for dry concrete) are "more negative" than the "stronger" backscattering coefficients (like the VV backscattering coefficient represented by the curve 26b for new asphalt or represented by the curve 27b for weathered asphalt).

The curves 24a, 24b, 24c represent the HH, VV and HV backscattering coefficients, respectively, for dry concrete. The curves 25a, 25b and 25c represent the HH, VV and HV backscattering coefficients, respectively, for weathered wet asphalt, whereas the curves 26a, 26b, 26c represent the HH, VV and HV backscattering coefficients, respectively, for new asphalt and the curves 27a, 27b and 27c represent the HH, VV and HV backscattering coefficients, respectively, for weathered dry asphalt. Furthermore, the curves 28a and 28b represent the HH and VV backscattering coefficients, respectively, for wet concrete. The HV backscattering coefficient has not been available for wet concrete.

As can be derived from the data as shown in FIG. 3, the VV or HH backscattering coefficients are suitable to distinguish concrete and asphalt in general, but they are not suitable to distinguish wet and dry road surfaces. Furthermore, the ratio of the backscattering coefficients (HH/VV) is not suitable to distinguish road surfaces for the used radar frequency of 77 GHz.

The curves 24c, 25c, 26c and 27c indicate that the HV backscattering coefficient shows the strongest variation with respect to roughness and material of the road surface and with respect to weather conditions, while the VV backscattering coefficient is the least effected, as can be seen by the curves 24a, 25a, 26a, 27a and 28a. Therefore, the difference between the VV and HV backscattering coefficients is expected to be huge and to be suitable for separating different road conditions appropriately.

This is shown in FIG. 4, in which the ratio of the HH and VV backscattering coefficients is depicted over the difference between the VV backscattering coefficient and the HV backscattering coefficient. For the representation of FIG. 4, the ratio HH/VV clusters in different regions when plotted over VV−HV. In detail, separate regions can be identified for different road conditions, i.e. a region 31 for wet asphalt, a region 33 for dry asphalt, a region 35 for dry concrete and a region 37 for grass. It is noted that further data for the backscattering coefficient have been taken from Viikari, V. et al.: "Automotive radar technology for detecting road conditions. Backscattering properties of dry, wet, and icy asphalt", 2008 European Radar Conference, 30-31 Oct. 2008, IEEE, Amsterdam, Netherlands. That is, if a suitable HV backscattering coefficient is available, it is possible to distinguish e.g. wet asphalt 31 from dry concrete 35, which has not been possible for former methods of the related art relying on e.g. the ratio HH/VV only.

If the HV backscattering coefficient is not available, i.e. if this backscattering coefficient is smaller than a predetermined cross-polarization threshold, the ratio of the HH backscattering coefficient and the VV backscattering coefficient is used as a function of the difference between the VV backscattering coefficient and the HH backscattering coefficient, as is shown in FIG. 5. As can be seen, for grass and snow separate regions 48, 49 can be identified again. It is noted, however, that a plurality of data points based on the respective radar signals has to be used in order to identify the regions 48, 49 based on respective averages. Furthermore, the regions 48, 49 for grass and snow, respectively, differ from the further regions 41, 43, 45 and 47 for the other road conditions in that for the region 49 representing snow the difference VV−HH is negative, while the ratio HH/VV is smaller than 1, and in that for the region 48 representing grass the difference VV−HH is close to 0, while the ratio HH/VV is close to 1.

As can be seen in FIG. 5, the further regions for the other road conditions overlap, i.e. the region 41 for wet asphalt, the region 43 for dry asphalt, the region 45 for wet concrete and the region 47 for dry concrete. However, the regions 41 and 45 for wet surfaces tend to have widely spread data points, i.e. a high variance, while the regions 43, 47 for dry surfaces tend to have data points clustering in a narrow region, i.e. having a low variance. Therefore, it is possible to distinguish wet and dry road surfaces by analyzing the variance of the ratio HH/VV when plotted over the difference VV−HH.

For distinguishing different types or materials of road surfaces, one of the cross-polarized backscattering coefficients can additionally be considered, i.e. in addition to the analysis as shown in FIG. 5, if the HV backscattering coefficient is not available. As an example, the relationship of the VV backscattering coefficient and the elevation angle is shown in FIG. 6. For a given elevation angle, e.g. 75° (corresponding to −15° with respect to the longitudinal direction of the vehicle 11), the curves 51 and 53 for wet asphalt and dry asphalt, respectively, separate from the curves 55 and 57 for wet concrete and dry concrete, respectively, with respect to the VV backscattering coefficient.

Based on the observations as shown in FIGS. 4, 5 and 6 and as described above, a decision tree is derived for determining road conditions. The decision tree is shown in FIG. 7 and represents an embodiment of the method according to the disclosure. In addition, the radar system 13 is configured to perform the method steps via the processing device 19. The method starts at step 100 where it is determined whether the HV backscattering coefficient is available. In other words, it is determined whether the HV backscattering coefficient is greater than or equal to a cross-polarization threshold.

If the HV backscattering coefficient is available, the ratio of the HH backscattering coefficient and the VV backscattering coefficient is plotted over the difference between the VV and the HV backscattering coefficients at step 110. An example for the step 110 is shown in FIG. 4. Within such a representation like in FIG. 4, thresholds can be defined in order to distinguish e.g. dry and rough road surfaces 130 from smooth and wet road surfaces 140. In addition, different types or materials of road surfaces can be distinguished as is shown in FIG. 4.

If the HV backscattering coefficient is not available, the ratio of the HH backscattering coefficient and the VV backscattering coefficient is plotted over the difference between the VV backscattering coefficient and the HH backscattering coefficient at step 120. It is noted that a plurality of respective backscattering coefficients is determined at different elevation angles (see e.g. FIGS. 3 and 6), the statistical calculations are done for the respective ratio and the respective difference of the backscattering coefficients. An example for the representation of step 120 is shown in FIG. 5. It is determined at step 121 whether the average of the difference VV−HH is greater than 0 and whether the average of the ratio HH/VV is greater than 1 at the same time. In contrast, it is determined at step 122 whether the average of the difference VV−HH is equal to or smaller than 0 and whether the average of the ratio HH/VV is equal to or smaller than 1 at the same time. The respective averages are calculated based on a plurality of data points derived from the respective radar signals as described above.

If step 121 is valid (i.e. the average of HH/VV is greater than 1 and the average of VV−HH is greater than 0), the variance of the data points for the representation of step 120 is determined, i.e. for the data points as shown for example in the regions 41, 43, 45 and 47 of FIG. 5. If a large variance is determined (e.g. larger than a variance threshold), a wet surface is determined at step 170, whereas a dry surface is determined at step 180 for a small variance (i.e. smaller than the variance threshold). In both cases, the VV backscattering coefficient is additionally used to determine the type or material of the road surface at step 190. An example for this determination is shown in FIG. 6. That is, a further threshold is defined for the VV backscattering coefficient in order to distinguish the different surface types or different materials of the road at step 200, e.g. asphalt or concrete.

If step 122 is valid (i.e. the average of the ratio HH/VV is close to or smaller than 1 and the average of the difference VV−HH is close to or smaller than 0), the averages of the data points for the representation of step 120 is used to distinguish between an irregular rough road, e.g. including gravel or grass, and snow on the road. In detail, if the average of HH/VV is close to 1 and the average of VV−HH is close to 0, as shown for the region 48 in FIG. 5, the road condition is determined to include a high irregularity due to vertical objects (e.g. including grass or gravel) at step 220. Furthermore, if the average of HH/VV is less than 1 and the average of VV−HH is less than 0, as shown for the region 49 in FIG. 5, the road condition is determined at step 230 to include snow on the road.

It is noted that a plurality of data points is required for performing step 120 and all further steps relying thereon, whereas one single data point is generally sufficient in order to perform steps 110, 130 and 140. The decision tree as shown in FIG. 7 requires a low computational effort e.g. in comparison to a support vector machine which is known in the related art for performing similar tasks. In addition, the radar system 13 (see FIG. 1) requires one single radar frequency only, e.g. 77 GHz.

As an alternative to the use of different thresholds as described above and to applying these thresholds within the decision tree of FIG. 7, a machine learning algorithm, e.g. a neural network, may also be used for distinguishing between different predefined road conditions. Applying a neural network may require that a suitable number of primary input data, i.e. radar returns, has to be available. However, any other procedure may be used for analyzing the backscattering coefficients in an equivalent manner to the method steps as described above, e.g. by implementing a support vector machine.

REFERENCE NUMERAL LIST

11 vehicle
13 radar system
14 antennas for emitting horizontally polarized waves
15 radar transmitter unit
16 antennas for emitting vertically polarized waves
17 radar receiving unit
18 antennas for receiving horizontally polarized waves
19 processing device
20 antennas for receiving vertically polarized waves
21 road surface
22-H, 22-V integrated circuits for a respective MIMO system
23 part of the road surface
25 transmitted radar waves
27 received radar waves
24a HH backscattering coefficient for concrete
24b VV backscattering coefficient for concrete
24c HV backscattering coefficient for concrete
25a HH backscattering coefficient for weathered wet asphalt
25b VV backscattering coefficient for weathered wet asphalt
25c HV backscattering coefficient for weathered wet asphalt
26a HH backscattering coefficient for new asphalt
26b VV backscattering coefficient for new asphalt
26c HV backscattering coefficient for new asphalt
27a HH backscattering coefficient for weathered asphalt
27b VV backscattering coefficient for weathered asphalt
27c HV backscattering coefficient for weathered asphalt
28a HH backscattering coefficient for wet concrete
28b VV backscattering coefficient for wet concrete
30 diagram for emitted H and V signals
31 region for wet asphalt
33 region for dry asphalt
35 region for concrete
37 region for grass
41 region for wet asphalt
43 region for dry asphalt
45 region for wet concrete
47 region for dry concrete
48 region for grass
49 region for snow
51 curve for wet asphalt
53 curve for dry asphalt
55 curve for wet concrete
57 curve for dry concrete
100-230 method steps

The invention claimed is:

1. Method for determining a condition of a road by using a radar system,
   wherein the radar system comprises a radar transmitter unit configured to transmit radar waves having two different polarizations and a radar receiving unit configured to receive radar waves having two different polarizations, and
   wherein the radar system is configured to provide transmit signals and receive signals indicating an intensity of the respective transmitted and received radar waves, the method comprising:
- determining, via a processing device, co-polarized backscattering coefficients and at least one cross-polarized backscattering coefficient based on the transmit signals and the receive signals provided by the radar system,
- if the cross-polarized backscattering coefficient is greater than or equal to a predetermined cross-polarization threshold, determining, via the processing device, the condition of the road based on a ratio of the co-polarized backscattering coefficients and based on a difference of one of the co-polarized backscattering coefficients and the cross-polarized backscattering coefficient, and
- if the cross-polarized backscattering coefficient is smaller than the cross-polarization threshold, determining, via the processing device, the condition of the road based on the ratio and a difference of the co-polarized backscattering coefficients.

2. Method according to claim 1, wherein
the radar transmitter unit is configured to transmit radar waves having horizontal polarization and radar waves having vertical polarization, and the radar receiving unit is configured to receive radar waves having horizontal polarization and radar waves having vertical polarization,
the ratio of the co-polarized backscattering coefficients is determined by dividing a backscattering coefficient for horizontally polarized transmitted radar waves and horizontally polarized received radar waves (HH backscattering coefficient) by a backscattering coefficient for vertically polarized transmitted radar waves and vertically polarized received radar waves (VV backscattering coefficient).

3. Method according to claim 2, wherein
the cross-polarized backscattering coefficient is the backscattering coefficient for horizontally polarized transmitted radar waves and vertically polarized received radar waves (HV backscattering coefficient).

4. Method according to claim 3, wherein
if the HV backscattering coefficient is greater than or equal to the predetermined cross-polarization threshold, the difference of one of the co-polarized backscattering coefficients and the cross-polarized backscattering coefficient is determined as the difference between the VV backscattering coefficient and the HV backscattering coefficient.

5. Method according to claim 3, wherein
if the HV backscattering coefficient is smaller than the predetermined cross-polarization threshold, the difference of the co-polarized backscattering coefficients is determined as the difference between the VV backscattering coefficient and the HH backscattering coefficient.

6. Method according to claim 3, wherein
if the HV backscattering coefficient is smaller than the predetermined cross-polarization threshold, a plurality of HH backscattering coefficients and a plurality of VV backscattering coefficients are determined at different elevation angles, and wetness of the road is determined based on a variance of the ratio with respect to the difference.

7. Method according to claim 6, wherein
the condition of the road includes a wet surface if the variance is greater than a predetermined variance threshold, and the condition of the road includes a dry surface if the variance is equal to or smaller than a predetermined variance threshold.

8. Method according to claim 6, wherein
determining the condition of the road additionally includes determining a material of the road based on one of the co-polarized backscattering coefficients.

9. Method according to claim 8, wherein
the material of the road is determined based on the VV backscattering coefficient.

10. Method according to claim 3, wherein
if the HV backscattering coefficient is smaller than the predetermined cross-polarization threshold, a plurality of HH backscattering coefficients and a plurality of VV backscattering coefficients are determined, and
if an average of the ratio of the HH backscattering coefficients and the VV backscattering coefficients is smaller than or equal to 1 and an average of the difference between the VV backscattering coefficients and the HH backscattering coefficients is smaller than or equal to 0, the condition of the road is determined based on the average of the ratio with respect to the average of the difference.

11. Method according to claim 10, wherein
the condition of the road includes a high irregularity due to vertical objects if the average of the ratio of the HH backscattering coefficients and the VV backscattering coefficients is close to 1 and the average of the difference between the VV backscattering coefficient and the HH backscattering coefficient is close to 0,
the condition of the road includes snow on the road if the average of the ratio of the HH backscattering coefficients and the VV backscattering coefficients is smaller than 1 and the average of the difference between the VV backscattering coefficient and the HH backscattering coefficient is smaller than 0.

12. Method according to claim 1, wherein
if the cross-polarized backscattering coefficient is greater than or equal to the predetermined cross-polarization threshold, the condition of the road is determined based on thresholds for the ratio of the co-polarized backscattering coefficients and for the difference of one of the co-polarized backscattering coefficients and the cross-polarized backscattering coefficient.

13. Method according to claim 12, wherein
for a plurality of predefined road conditions, the thresholds define respective ranges for the ratio of the co-polarized backscattering coefficients and respective ranges for the difference of one of the co-polarized backscattering coefficients and the cross-polarized backscattering coefficient, and
a respective combination of a range for the ratio of the co-polarized backscattering coefficients and of a range for the difference of one of the co-polarized backscattering coefficients and the cross-polarized backscattering coefficient is uniquely related to one of the plurality of predefined road conditions.

14. Radar system configured to be installed at a vehicle, the radar system comprising:
- a radar transmitter unit configured to transmit radar waves having two different polarizations and to provide transmit signals indicating an intensity of the transmitted radar waves,
- a radar receiving unit configured to receive radar waves having two different polarizations and to provide receive signals indicating an intensity of the received radar waves, and a processing device configured to:
- determine co-polarized backscattering coefficients and at least one cross-polarized backscattering coefficient based on the transmit signals and the receive signals,
- if the cross-polarized backscattering coefficient is greater than or equal to a predetermined cross-polarization threshold, determine the condition of the road based on a ratio of the co-polarized backscattering coefficients and based on a difference of one of the co-polarized backscattering coefficients and the cross-polarized backscattering coefficient, and
- if the cross-polarized backscattering coefficient is smaller than the cross-polarization threshold, determine the condition of the road based on the ratio and a difference of the co-polarized backscattering coefficients.

15. Non-transitory computer readable medium comprising instructions for carrying out the computer implemented method of claim 1.

* * * * *